United States Patent [19]

Collet et al.

[11] Patent Number: 4,480,381
[45] Date of Patent: Nov. 6, 1984

[54] ALIGNING AND LOCATING APPARATUS

[75] Inventors: Erwin Collet, Lünen; Heribert Loweg, Werne, both of Fed. Rep. of Germany

[73] Assignee: Gewerkschaft Eisenhutte Westfalia, Lunen, Fed. Rep. of Germany

[21] Appl. No.: 468,508

[22] Filed: Feb. 22, 1983

[30] Foreign Application Priority Data

Feb. 24, 1982 [DE] Fed. Rep. of Germany ....... 3206498

[51] Int. Cl.³ ............................................. B23P 19/00
[52] U.S. Cl. ........................................ 29/746; 29/468; 29/825
[58] Field of Search .................. 29/746, 467, 468, 707, 29/825; 228/122, 49; 204/286, 288, 289; 373/94, 101, 114

[56] References Cited

U.S. PATENT DOCUMENTS 2,876,554 3/1959 Reynard ............................ 29/746 X
2,995,804 8/1961 Wheeler ............................ 29/746 X
3,579,819 5/1971 Rozema et al. .................... 29/468 X

FOREIGN PATENT DOCUMENTS 2547061 4/1977 Fed. Rep. of Germany ...... 204/286
52-53586 4/1977 Japan .................................. 29/464

Primary Examiner—Howard N. Goldberg
Assistant Examiner—Carl J. Arbes
Attorney, Agent, or Firm—Thompson, Birch et al.

[57] ABSTRACT

Apparatus is disclosed for aligning and locating the nipples of an anode rod with the blind bores formed in one surface of an anode block. The apparatus includes a support table mounted for vertical movement on a stand. Alignment means are mounted on the stand above the support table. The alignment means is constituted by a plurality of alignment elements, each of which has the shape of a segment of a funnel. In use, the narrow ends of the alignment elements are introduced into respective bores in the anode block as the support table is moved upwardly. As the support table moves further upwards, carrying the alignment elements therewith, at least some of the nipples of the anode rod engage within the wider ends of the alignment elements, thereby directing the nipples into the bores in the anode block.

18 Claims, 5 Drawing Figures

ALIGNING AND LOCATING APPARATUS

BACKGROUND TO THE INVENTION

This invention relates to apparatus for aligning and locating a block and a holder therefor, and in particular to aligning and locating apparatus for an anode block and an associated anode rod.

In the electrolytic extraction of aluminium, it is known to make use of anodes consisting of synthetic carbon blocks which are mounted on metallic anode rods. For this purpose, the anode rods are provided with projections (nipples) at their lower ends, the nipples being introduced into bores formed in the anode blocks, and are secured therein by a casting operation. It is also known to connect the anode blocks to the anode rods by mechanical means. In this system, an anode rod, which is suspended from a travelling crane, is moved over a support table carrying an anode block. In this position, the anode rod is aligned with the anode block by means of centering jaws. The anode rod is then secured in position, so that, when the anode block is lifted, the nipples of the anode rod move into the bores of the anode block. This known apparatus suffers from the disadvantage that even slight inclination of the anode rod prevents its nipples from being directed accurately into the bores formed in the anode block. In such a case, automatic operation is impossible, so that manual intervention becomes necessary.

The aim of the invention is to provide aligning and locating apparatus which can be used in the mechanical interconnection of an anode block and an anode rod at a rapid rate, even when the axis of the anode rod is not aligned in a precisely parallel manner with the axes of the bores of the anode block.

SUMMARY OF THE INVENTION

The present invention provides apparatus for aligning and locating a block and a holder therefor, the block having a plurality of blind bores formed in one surface thereof for receiving complementary projections provided on the holder, the apparatus comprising a stand, a support table and alignment means, the support table being mounted on the stand for movement relative thereto, and the alignment means being mounted on the stand above the support table, wherein the alignment means is provided with a plurality of alignment elements, each of which has the shape of a segment of a funnel, the alignment means being such that the narrow end of each of the alignment elements is introduced into a respective bore in a block positioned on the support table as the table is moved upwardly, and such that at least some of the projections of a holder positioned above the alignment means engage within the wider ends of the alignment elements, thereby directing the projections into the bores of the block as the support table subsequently moves upwardly towards the holder.

Preferably, the block is a carbon anode block, and the holder is a metallic anode rod.

Thus, in order to direct the projections (nipples) into the bores formed in the anode block, use is made of special alignment elements which have roughly the shape of a segment of a funnel (or hollow truncated cone). The narrow (lower) ends of the alignment elements are first introduced into the bores of the anode block. The anode block is then moved towards the anode rod, so that the nipples are pushed into the bores from the wide ends of the alignment elements. Upon impact, with the nipples, the alignment elements positively guide the nipples into the bores, with the result that, even when preliminary centering is not precise and when the anode rod is inclined relatively to the axes of the bores, the nipples slide in a positive manner into the bores.

In order to prevent the alignment elements from moving out of the bores, each of the alignment elements is provided with an axial protrusion at its narrow end, the axial protrusions being engageable within the respective bores. Preferably, each of said axial protrusions is a hollow, part-cylindrical member.

Advantageously, the cone angle of each of the funnel-shaped alignment elements lies in the range of from 50° to 120°, and preferably in the range of from 60° to 80°.

Advantageously, each of the alignment elements is resiliently mounted on a respective arm. The resilient mounting of the alignment elements is advantageously designed in such a manner that these elements are spring biassed towards a mutually-parallel median position; and such that, as the nipples are directed into the bores, axial restoring movements, as well as slight tilting movements against the spring-return force, can take place. The resilient mounting of the alignment elements ensures that the nipples can always be directed into the bores without manual help.

In a preferred embodiment, there are four alignment elements and two arms, two alignment elements being associated with each of the arms.

Advantageously, each of the arms is mounted on the stand for pivotal movement transversely of the direction of movement of the support table. Thus, the arms can be pivoted out laterally to such extent that the assembled unit, consisting of the anode rod and the anode block, can be moved laterally out of the apparatus and into a station where the bores are filled up by a casting or grouting operation. Before the arms are pivoted out laterally, they are moved upwardly so as to extract the nipples from the bores.

Advantageously, the arms are mounted on a common slide which is mounted on the stand for movement in the direction of movement of the support table. Preferably, the slide is slidably movable on guides associated with the stand, and each of the arms is pivotably attached to the slide.

In a preferred embodiment, the alignment elements are operatively associated with the support table so that, after being introduced into their respective bores, they can be lifted together with the block toward the holder. Preferably, the support table is provided with at least one upwardly-projecting lifting arm having an impact pad at its upper end, the or each impact pad being engageable with the slide thereby constituting said operative association between the support table and the alignment elements.

Conveniently, the slide can be raised and lowered, independently of the support table, by means of a lifting device. Preferably, a pneumatic ram constitutes the lifting device.

The anode rod is expediently moved into the apparatus by means of a travelling crane, and during connection to the anode block is held on the crane cable. Advantageously, the stand is provided with positioning means for positioning the holder above the alignment means. This positioning means is effective to move the anode rod, suspended on the crane cable, into its preliminary assembly position. Preferably, the positioning means is constituted by a displaceable lateral stop, and a pair of centering jaws connected thereto. The jaws may be actuated by, for example, a pressurized ram, and they may be connected to the lateral stop.

The invention also provides a method of aligning and locating an anode block and a holder therefor, the anode block having a plurality of blind bores formed in one surface thereof for receiving complementary projections provided on the holder, the method comprising the steps of positioning the anode block on a support table, moving the support table towards a plurality of alignment elements, each of which has the shape of a funnel, until each of the alignment elements enters a respective bore in the anode block, and moving the support table together with the anode block and the alignment elements towards the holder so that at least some of the projections of the holder engage within the wider ends of the alignment elements, thereby directing the projections into the bores of the anode block.

BRIEF DESCRIPTION OF THE DRAWINGS

Aligning and locating apparatus constructed in accordance with the invention will now be described, by way of example, with reference to the accompanying drawings, in which.

DESCRIPTION OF PREFERRED EMBODIMENT

Figure 1:
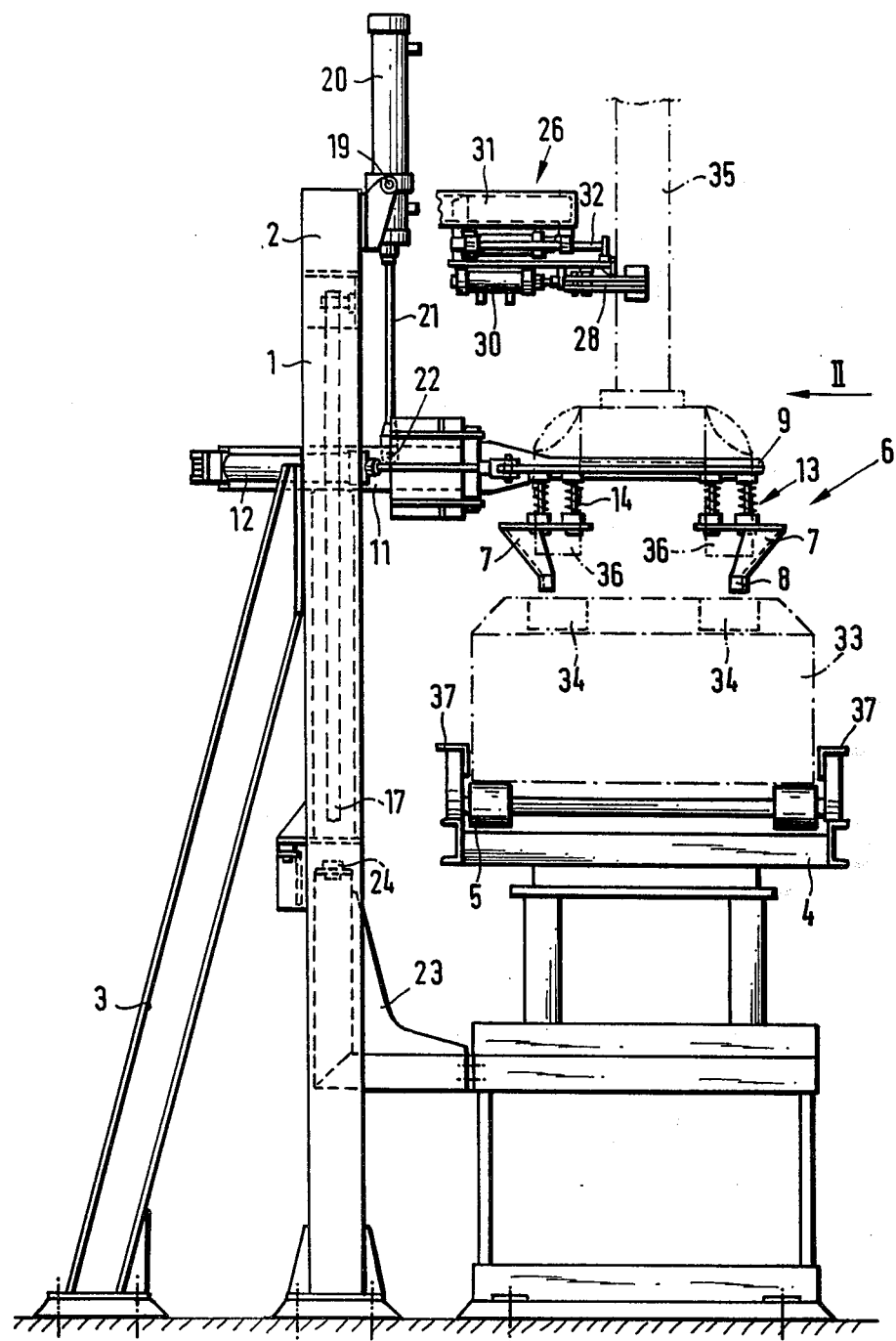
FIG. 1 is a diagrammatic side elevation of the apparatus.

Referring to the drawings, FIG. 1 shows an aligning and locating apparatus having a stand constituted by a pair of vertical struts 1 whose upper ends are interconnected by a cross-beam 2. The rear sides of the struts 1 are supported on the floor by inclined struts 3. A vertically-movable support table is provided on that side of the stand opposite the inclined struts 3, the table being provided with support rollers 5. The table 4 can be raised and lowered by means of, for example, hydraulic rams (not shown). FIG. 1 shows the table 4 in its lowermost position.

Figure 5:
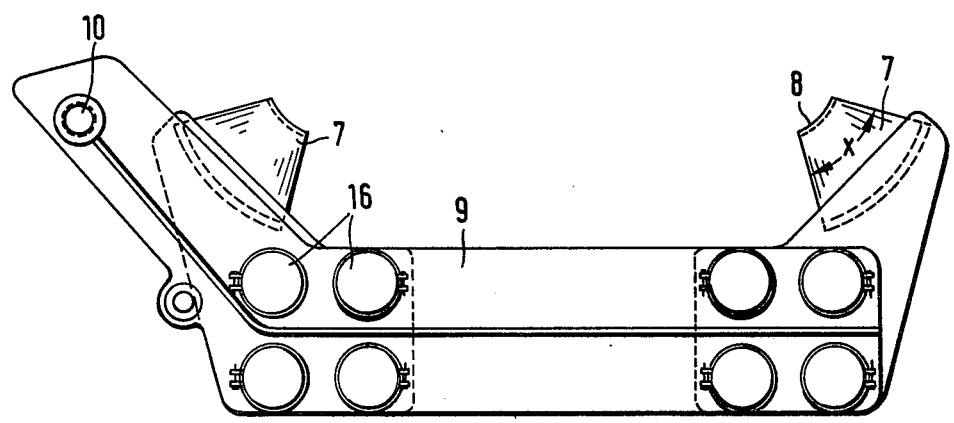
FIG. 5 is a plan view of that part of the apparatus shown in FIG. 4.

Alignment means 6 are mounted on the stand above the table 4, the alignment means having four alignment elements 7, each of which is roughly in the shape of the segment of a funnel or of a hollow truncated cone. An axially-extending, part-cylindrical attachment 8 is provided at the lower narrower end of each of the alignment elements 7. The cone angle X (see FIG. 5) of each of the alignment elements 7 lies in the range of from 50° to 120°, and preferably lies between 60° and 80°.

The alignment elements 7 are arranged, in pairs, on two arms 9. Each of the arms 9 is pivotally mounted, at one end thereof, to a common slide 11, by a respective pivot joint 10. Each of the pivot joints 10 defines a vertical pivot axis. A respective pneumatic ram 12 is pivotally mounted between each of the arms 9 and the slide 11, the pneumatic rams being effective to pivot the arms about their vertical pivot joints 10 in the directions indicated by the arrows S (see FIG. 3). Each of the alignment elements 7 is positioned on the lower face of its associated arm 9, and is resiliently mounted thereon by four spring devices 13. Each of the spring devices 13 is constituted by a compression spring 14, a vertical bolt 15, and a bellows 16. The four bolts 15 associated with each of the alignment elements 7 loosely connect that element to the associated arm 9. Each of these bolts 15 is surrounded by its spring 14, which in turn is disposed within the respective bellows 16. The springs 14 and bolts 15 are, therefore, protected by their bellows 16, and the alignment elements 7 are mounted on the arms 9 so as to be both axially (upwardly and downwardly) and transversely displaceable against the return forces of the spring devices 13.

The slide 11, which supports the arms 9, is guided for vertical reciprocation between the struts 1 of the stand. For this purpose, a respective vertical guide rod 17 is arranged on the inner face of each of the two struts 1, the slide 11 being guided on the vertical guide rods by means of collars 18 fixed to support arms 25 which depend from the slide (see FIG. 2). A pneumatic ram 20 is provided for raising and lowering the slide 11, the piston rod 21 of the ram being pivotally attached, by a pivot joint 22, to the centre of the slide; and the cylinder of this ram being mounted on the cross-beam 2 in a pivot bearing 19. Thus, by retracting the ram 20, the slide 11, together with the arms 9 and the alignment elements 7, can be raised from the lowermost position shown in FIG. 1. Similarly, by extending the ram 20, the slide can be lowered.

The slide 11 is also drivably connectible to the table 4. For this purpose, two lifting arms 23 are firmly connected to the table 4, these lifting arms carrying impact pads 24 at their upper ends. The impact pads 24 cooperate with the support arms 25 which are secured to the lower face of the slide 11.

Figure 3:
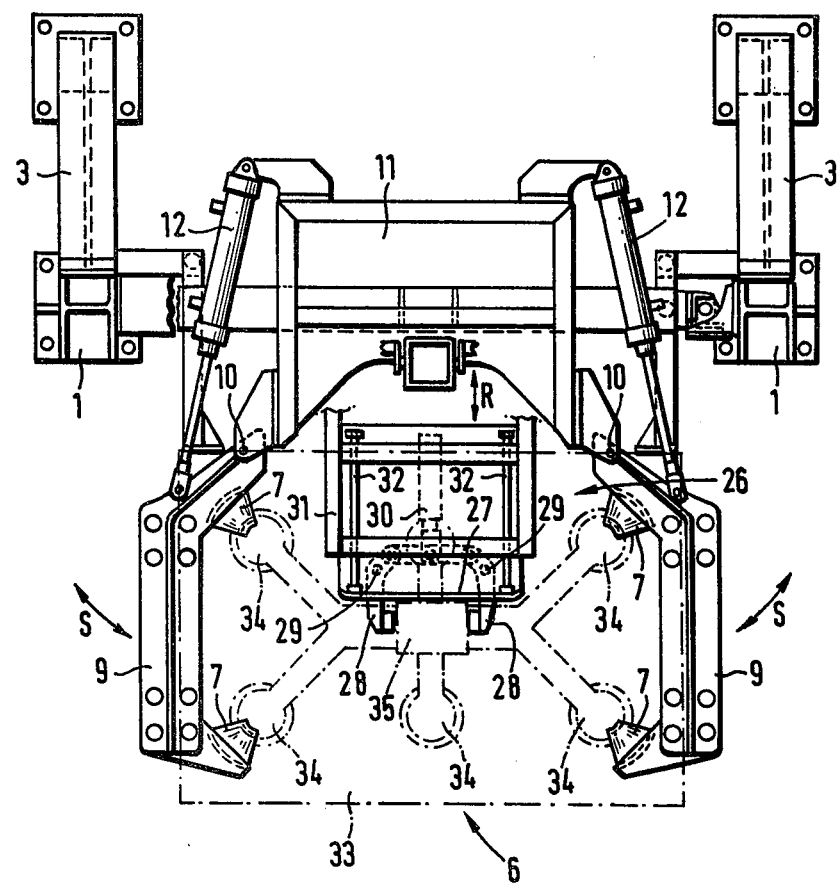
FIG. 3 is a plan view, looking in the direction of the arrow III shown in FIG. 2, of that part of the apparatus shown in FIG. 2.

As shown in FIGS. 1 and 3, a positioning means 26 is provided on the stand above the alignment means 6. The positioning means 26 comprises a lateral stop 27, and two centering jaws 28. The jaws 28 can be pivoted, about vertical pivot pins 29, by means of a common hydraulic ram 30. The lateral stop 27, the two centering jaws 28 and the ram 30 are mounted on a frame 31 in such a manner as to be displaceable in the direction of the arrow R (see FIG. 3). This displacement can be achieved by means of, for example, screw-threaded rods 32.

Figure 2:
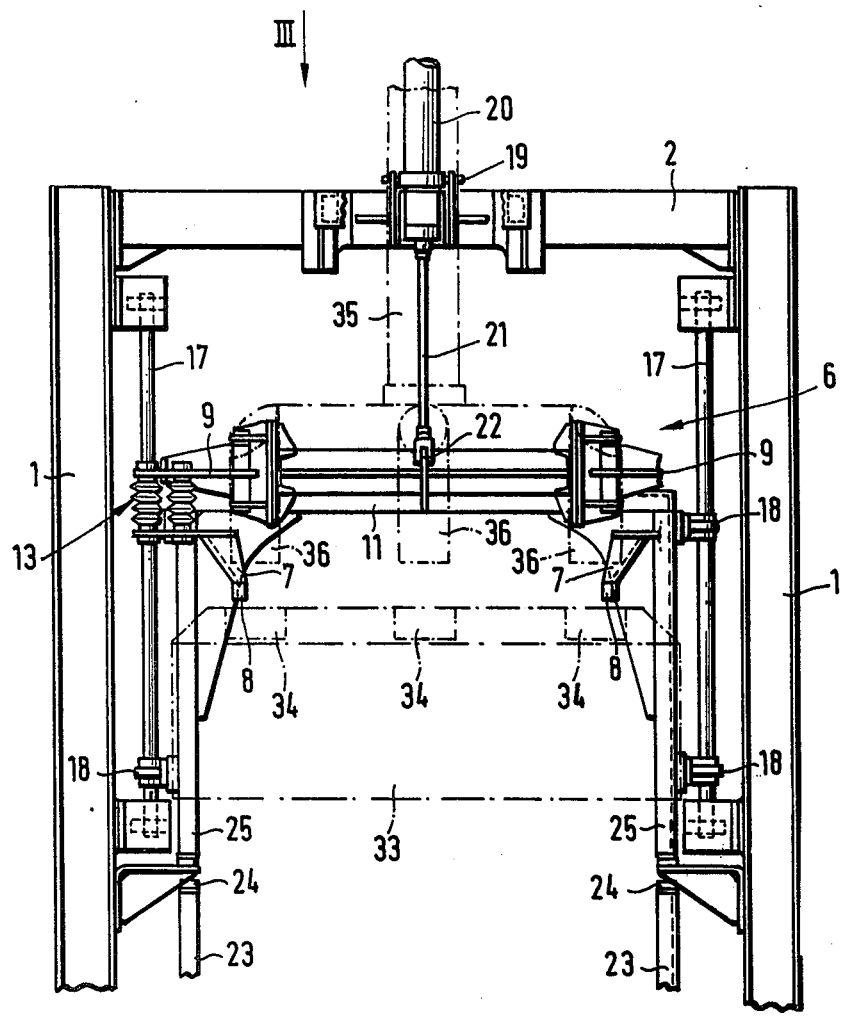
FIG. 2 is an elevation, looking in the direction of the arrow II shown in FIG. 1, of part of the apparatus.

FIGS. 1 to 3 show the apparatus together with a single anode block 33 (shown in dash-dot lines). The anode block 33 is a roughly cuboidal synthetic carbon block, whose upper surface is provided with six blind bores 34 arranged in two rows of three. FIGS. 1 to 3 also show (in dash-dot lines) an anode rod 35 which is to be connected to the anode block 33. The anode rod 35 is of rectangular cross-section, and carries six anode nipples 36 at its lower end.

Figure 4:
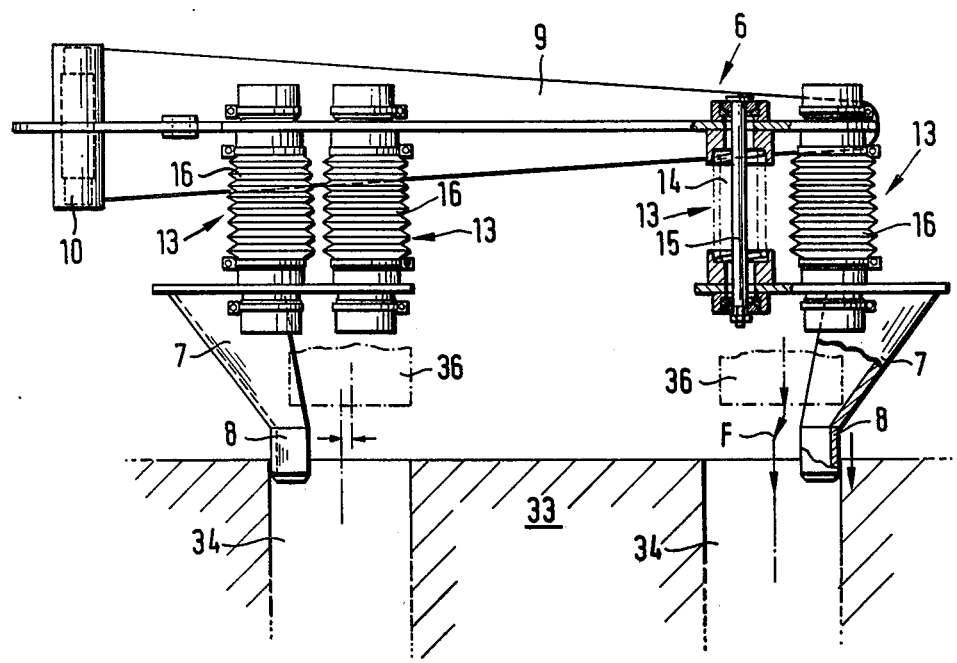
FIG. 4 is a part-sectional side elevation, on a larger scale, of another part of the apparatus of FIGS. 1 to 3.

In order to assemble the anode rod 35 and the anode block 33, the anode block is positioned on the support rollers 5 of the table 4, using lateral abutment members 37, so that the bores 34 lie below the alignment elements 7. Then, the anode block 33 is raised with the table 4 to such an extent that the axial protrusions 8 of the alignment elements 7 are pushed into the bores 34 to a predetermined extent of, for example, 40 millimeters. With the aid of a travelling crane (not shown), the anode rod 35 will have previously been moved into the positioning means 26 so as to lie against the lateral stop 27. The centering jaws 26 are then pivoted towards the anode rod 35 with the aid of the ram 30, so that the anode rod is held between the centering jaws. As soon as the axial protrusions 8 have been introduced into the bores 34 by the required distance, the lifting arms 23 are moved upwards with the table 4 until their stop pads 24 strike the lower ends of the support arms 25. Continued upward movement of the table 4, then causes the slide 11, the arms 9 and the alignment elements 7 to move upwards. As this happens, the nipples 36 are pushed into the upwardly-widening alignment elements 7, these elements directing the nipples into the bores 34 formed in the anode block 33. If the anode rod 35 is held in the positioning means 26 in such a way that its axis is slightly inclined to the vertical, the nipples 36 strike the frusto-conical internal surface of at least one of the alignment elements 7, during upward movement of the alignment elements, so that (as shown in FIG. 4 by the arrows F) the nipples 36 are laterally deflected, and are directed into the bores 34 formed in the anode block 33. The resilient mounting constituted by the spring devices 13 ensures that the alignment elements 7 are parallel, prior to being introduced into the bores 34; and also enables the alignment elements to be adjusted to the position of the bores 34. While the nipples 36 are being directed into the bores 34, the protrusions 8 of the alignment elements 7 remain in engagement with the bores 34. The resilience of the anode rod 35, and/or the clearance of the anode rod as it moves within the positioning means 26, permits the nipples 36 to be directed into the bores 34 without the need for precise alignment of the anode rod within the positioning means.

After the nipples 36 have been directed into the bores 34 in the anode block 33, the alignment means 6 is raised by the ram 20 so that the axial protrusions 8 of the alignment elements 7 are moved upwardly out of the bores 34. Then, with the aid of the rams 12, the arms 9 are pivoted away from one another, through an angle of at least 90°, in the direction of the arrows S (see FIG. 3). The anode block 33 and the anode rod 35 can then be extracted laterally from the apparatus, after the anode rod has been released from the positioning means 26. The fitted-together anode block 33 and anode rod 35 are then moved to a downstream station, where molten metal is poured into the bores 34 to fix the two members firmly together. The anode block 33 and the anode rod 35 can be removed from the table 4 by way of a roller bed (not shown) adjoining the support rollers 5. In order to receive a further anode block 33, the table 4 is then lowered into the position shown in FIG. 1.

In the arrangement described above, the anode rod 35 has six nipples 36, and the anode block 33 has six complementary bores 34. The number of nipples 36 and bores 34 may, of course, be different from this. Four, rectangularly-arranged alignment elements 7 are used in the apparatus described above. However, depending upon the number of nipples 36 and bores 34, it is also possible to provide a different number of alignment elements 7.

We claim:

1. Apparatus for aligning and locating a block and a holder therefor, the block having a plurality of blind bores formed in one surface thereof for receiving complementary projections provided on the holder, the apparatus comprising a stand, a support table for supporting the block, said table being mounted on the stand for movement relative thereto, alignment means mounted on the stand above the table, said alignment means having a plurality of alignment elements, each alignment element having the shape of a segment of a funnel, the arrangement of said alignment means in relation to the block supported on said table being such that the narrow end of each of the alignment elements is introduced into a respective bore in the block as the table is moved upwardly, and such that at least some of the projections of a holder positioned above the alignment means engage within the wider ends of the alignment elements, thereby directing the projections into the bores of the block as the support table subsequently moves upwardly towards the holder.

2. Apparatus according to claim 1, wherein each of the alignment elements includes an axial protrusion at its narrow end, the axial protrusions being engageable within the respective bores.

3. Apparatus according to claim 2, wherein each of said axial protrusions is a hollow, part-cylindrical member.

4. Apparatus according to claim 1, wherein the cone angle of each of the funnel-shaped alignment elements lies in the range of from 50° to 120°.

5. Apparatus according to claim 4, wherein the cone angle of each of the alignment elements lies in the range of from 60° to 80°.

6. Apparatus according to claim 1, wherein the alignment elements are drivably connectible to the support table so that, after being introduced into their respective bores, they can be lifted together with the block towards the holder.

7. Apparatus according to claim 6, wherein each of the alignment elements is resiliently mounted on a respective arm.

8. Apparatus according to claim 7, wherein there are four alignment elements and two arms, two alignment elements being associated with each of the arms.

9. Apparatus according to claim 8, wherein each of the arms is mounted on the stand for pivotal movement transversely of the direction of movement of the support table.

10. Apparatus according to claim 9, wherein the arms are mounted on a common slide which is mounted on the stand for movement in the direction of movement of the support table.

11. Apparatus according to claim 10, wherein the slide is slidably movable on guides associated with the stand.

12. Apparatus according to claim 10, wherein each of the arms is pivotably attached to the slide.

13. Apparatus according to claim 10, wherein the support table includes at least one upwardly-projecting lifting arm having an impact pad at its upper end, said at least one impact pad being engageable with the slide thereby constituting said drivable connection between the support table and the alignment elements.

14. Apparatus according to claim 10, wherein the slide can be raised and lowered, independently of the support table, by means of a lifting device.

15. Apparatus according to claim 14, wherein a pneumatic ram constitutes the lifting device.

16. Apparatus according to claim 1, further comprising positioning means on said stand for positioning the holder above the alignment means.

17. Apparatus according to claim 16, wherein the positioning means comprises a displaceable lateral stop, and a pair of centering jaws connected thereto.

18. Apparatus according to claim 1, further comprising support rollers on said support table for supporting the block.

* * * * *